Aug. 19, 1930.  A. T. KILLIAN  1,773,461
ROLLER BEARING
Filed July 18, 1924
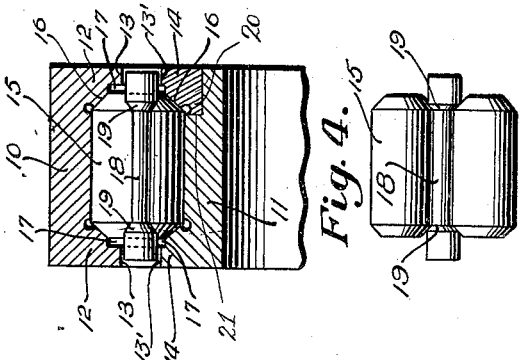
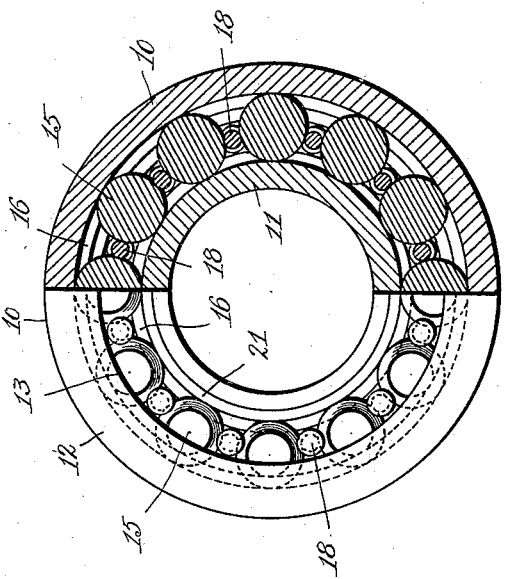
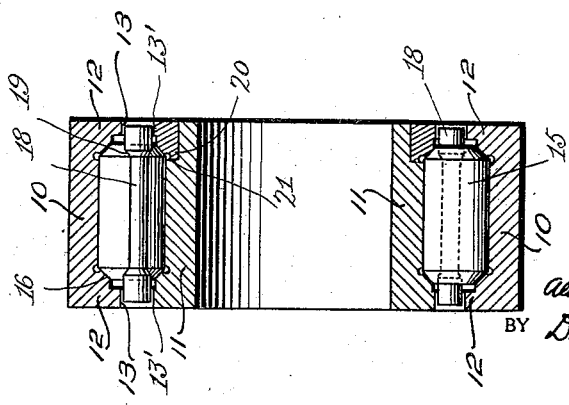
INVENTOR
Albert T. Killian
BY Davis & Davis
ATTORNEYS Patented Aug. 19, 1930

1,773,461

UNITED STATES PATENT OFFICE

ALBERT T. KILLIAN, OF PHILADELPHIA, PENNSYLVANIA

ROLLER BEARING

Application filed July 18, 1924. Serial No. 726,774.

The object of my invention is to provide a roller bearing wherein the rollers are maintained in true parallelism with the roller paths, simple and compact in arrangement and of great durability; that will minimize the number of manufacturing operations therein and reduce cost; can be readily taken apart for inspection and repairs; is adaptable to carry radial load and take end-thrust simultaneously; will retain the advantages of the best ball bearing and at the same time sustain much heavier loads, withstand more abuse, and will attain certain other advantages hereinafter more fully set forth.

In the drawing annexed—

Fig. 1 is a cross-sectional view of a bearing constructed in accordance with my invention;

Fig. 2 is a view, partly in side elevation and partly in section, of the same;

Fig. 3 is an enlarged transverse section through one side of the bearing; and

Fig. 4 is a side elevation of three of the rollers.

It is practically impossible to produce rollers and races commercially so that both ends will have exactly the same diameter. Therefore, it frequently happens that the larger ends of the rollers travel faster than the smaller ends, with the result that they become cramped or jammed between the ribs or flanges on the races and interfere with the free rolling of the rollers. If, with extreme precision and high cost, true cylinders could be manufactured, their efficiency would be destroyed by unequal loading of the bearings, internal end-thrust on the rollers and many other causes. It has been the impression that the employment of cages, retainers, separator-rollers with or without trunnions, fitting load rollers snugly between ribs on the races and various other such means would constrain the rollers to the proper path, but, in every instance the heavy pressure causes the rollers to twist and overcome the guiding effect of these devices. The jammed rollers cause the races to lock, preventing the bearing from performing the function for which it was intended and in most cases the strain breaks the bearing.

When roller bearings are subjected to both radial and end-thrust pressure in either direction, that is, the combination of radial and end-thrust loads on one bearing, the external end-thrust is resisted in diagonally opposite directions by the load rollers. The ends of the load rollers in contact with the ribs of the stationary race are retarded, while at the same time the opposite ends of the load rollers will travel in the direction of the rotating race. The extent to which the load rollers are thrown out of parallelism is directly dependent upon the force of the end-thrust.

It was for the purpose of correcting this ever present evil in roller bearings that my bearing was designed. The evil is not only effectively eliminated, but the bearing is brought to the highest state of efficiency. The arrangement of the parts, few in number, makes possible a bearing in which the friction has been reduced to a theoretical zero. The parts are so simple in design that when they are assembled into a complete unit, a compact bearing of great durability results.

One of the important features of my bearing is the provision made to continually maintain the parallelism of the rollers with the axis of the bearing. I employ rollers of different sizes to secure proper interlocking action of the rollers. The small or locking rollers are interposed between each pair of adjoining load rollers. These locking rollers control and maintain but do not force the parallelism of the load rollers as there is rolling contact at all times. The locking rollers perform a twofold purpose—they provide an effectual means of preserving the parallelism of the load rollers and prevent the load rollers from contacting with each other. Having the rollers interlock, as hereinafter set forth, holds the rollers in place without the use of a cage and other restraining means, thus simplifying the manufacture and increasing the facility with which the device may be put together and taken apart.

My bearing is composed of an inner annular ring 10 and an outer annular ring 11, which form the two relatively-rotatable parts and between which suitable rollers are placed. The outer annular ring has formed at its opposite ends inwardly-projecting flanges 12 which are provided with cylindrical surfaces 13. These flat surfaces are in true axial alinement with each other. The inner annular ring is provided with outwardly-projecting flanges 14 which have cylindrical surfaces 13' facing outwardly. The cylindrical surfaces on the flanges on the inner annular ring are parallel with the cylindrical surfaces on the flanges on the outer annular ring. The channels thus formed between the inner and outer annular rings and the flanges provide raceways to receive the load rollers 15. To sustain the maximum end-thrust, the extent of contact is increased by bevelled surfaces 16 formed on the inner sides of the flanges adjacent the edges of roller paths. The length of these bevelled surfaces is held within the desired limits by rabbeting the inner side of each flange at 17. Provision is thus made to resist end-thrust in either direction with the minimum of friction by having the bevelled surfaces arranged so that they cooperate at an angle to the axes of the load rollers. The load rollers are provided with bevelled surfaces at their ends near their peripheries, which contact with the corresponding bevelled surfaces of the races. The clearance between the bevelled surfaces on the load rollers and the bevelled surfaces on the races is sufficient for free rotation of the parts. This clearance may be increased to meet the requirements of the service for which the bearing is used without sacrificing its efficiency.

To effectively counteract any twisting of the load rollers due to end-thrust or other causes, locking rollers 18 are interposed between each pair of adjoining load rollers. The locking rollers have reduced central portions adapted to coact with the load rollers. The reduced portions have a small cross section permitting the maximum number of carrying units or load rollers in a given space. The enlarged ends of the locking rollers project beyond the load rollers and have bevelled surfaces 19 formed on their inner sides. These bevelled surfaces cooperate with, i. e., bear against, the corresponding bevelled surfaces on the ends of the load rollers that cooperate with the bevelled surfaces of the raceways. Both sets of rollers interlock and thereby prevent the load rollers from twisting out of parallelism except within the limits allowed by the locking rollers. The form and arrangement of the load rollers, locking rollers and raceways permit the load rollers to have a free rolling motion, but at the same time are restrained from deflecting or swerving from a straight line by the bevelled surfaces on the locking rollers. As a result, the load rollers do not tend to cramp or jam in the raceways.

The locking rollers are longer than the load rollers by having added to their length the enlarged ends whose straight cylindrical surfaces alternately roll upon the straight cylindrical surfaces of the flanges of the inner and outer raceways. To prevent the locking rollers from carrying any of the bearing load, the space between the flanges of the inner and outer raceways is adequate to allow the enlarged ends sufficient clearance for free rotation. The flanges, which thus act as tracks for the locking rollers, are so formed that the axes of the locking rollers are maintained on a straight line with the axes of the adjoining load rollers; because of this relative position of the two sets of rollers, the load rollers do not operate to force the locking rollers radially inward or radially outward. When the locking rollers are passing underneath the shaft or axle or at high speed, they roll upon the flanges of the outer raceway and are therefore retained against outward radial movement. At low speed, the locking rollers roll upon the flanges of the inner raceway when going over the top of shaft or axle and are retained against inward radial movement. The locking rollers are prevented from lateral displacement by the adjoining load rollers.

The inner annular ring has one of its flanges 14 removable to facilitate assembling. This flange is so formed that it has the same structural shape or appearance when in place on the inner annular ring as the flange at the opposite end. This removable flange is provided on its inner face with an extension 20 of less diameter than the roller path.

To assemble the bearing, the load rollers are placed in the raceway of the outer annular ring and held therein by a flat circular spring or other suitable means. The locking rollers are inserted between each pair of adjoining load rollers. The outer annular ring and rollers are then pushed over the inner annular ring which operates to force the flat spring out of the bearing. After all the parts are assembled, the removable flange is pressed on the reduced end of the inner annular ring until the extension 20 abuts the shoulder 21 and is securely fastened thereon. The bearing can be disassembled without injury to its parts by driving or forcing the inner annular ring out of the removable flange.

The simplicity of my bearing will be appreciated when its operation is understood. Suppose the inner annular ring remained stationary and the outer annular ring was travelling clockwise. This would cause the load rollers to rotate in the same direction as the outer annular ring, that is, toward the right, while the locking rollers would rotate in the opposite direction, or toward the left. Of course, both sets of rollers would bodily travel in the direction of the outer annular ring. When sustaining end-thrust in opposite directions, the lateral pressure of the outer annular ring relatively to the inner annular ring will force the bevelled surfaces of the outer raceway against the bevelled surfaces of the load rollers and the bevelled surfaces at the opposite ends of the load rollers will contact with the bevelled surfaces of the inner raceway, thus transmitting the lateral pressure from one raceway to the other, in either direction, through the same rollers.

An important feature of my bearing is that ample provision has been made to effectually counteract any tendency of the rollers to deflect due to end-thrust or other causes and at the same time retain a very simple construction of the bearing parts, and a low manufacturing cost. As a result, rollers can be used instead of balls. A bearing using rollers has a larger bearing surface than a ball bearing of equal size; consequently, it will withstand a greater end-thrust and carry a larger radial load. My bearing can be used purely as a radial bearing by providing some other means for taking care of any external end-thrust that may exist.

The important features of my present design, therefore, are as follows:

1. The use of the straight cylindrical surfaces on the flanges on the inner and outer annular rings to act as tracks for the the enlarged portions or heads of the locking rollers.

2. Locking rollers having enlarged ends bevelled at their inner sides running between the flanges of the inner and outer annular rings.

3. Maintaining the axes of the locking rollers on a straight line with the axes of the load rollers by the flanges of the inner and outer annular rings.

4. Rabbeting the inner sides of the flanges of the outer annular ring when the bearings are of small size, and rabbeting the inner sides of all flanges as shown when the bearings are of medium and large size. The space acts as a clearance for the ends of the large rollers and more particularly for shortening the bevel on the flanges so that a track of sufficient width will be provided for the enlarged portions of the locking rollers, and, further, it allows a clearance for the grinding wheel when grinding bevels. It also keeps the width of the bearing closer to the carrying length of the load rollers.

5. The extension on removable flange; this extension is of smaller diameter than roller path of inner annular ring, to provide a clearance for grinding wheel. The extension will serve to give the removable flange a wider surface of contact when pressed on end of inner annular ring, and also give more strength to the flange.

6. Fitting removable flange on inner annular ring and grinding both as a unit; this serves to keep the bevels and tracks for locking rollers concentric with the path of the load rollers.

7. Utilizing the flanges of inner and outer annular rings as means for retaining the centers of the locking rollers and adjoining load rollers in the same plane, thereby bringing the bevels of the locking rollers in contact with the bevels of the load rollers at a point where the locking rollers are most effective in maintaining the load rollers in parallelism with the minimum of friction. The same flanges serve to take all end-thrust imposed upon the bearing. By utilizing the flanges in this manner, cages, retainer caps, etc. are eliminated.

What I claim is:

A roller bearing embodying an inner ring and an outer ring, each having a central load-roller-surface and a pair of annular flanges around the edges of said load-roller-surfaces, the flanges on one ring being opposite the flanges on the other, all the facing-surfaces being cylindrical, the inner corners between the flanges and said load-roller-surfaces being beveled, load-rollers having beveled ends working on said beveled surfaces, and spacing-rollers having enlarged bevel heads running on the tracks afforded by the aforesaid facing-surfaces of both the inner and outer flanges, the bevels on said heads being at the inner ends of the heads so as to engage the corresponding beveled surfaces of the load-rollers, each pair of said flanges approaching said heads so closely as to maintain the center of each spacing-roller at all times approximately in a straight line with the center of the two adjacent load-rollers.

In testimony whereof I hereunto affix my signature.

ALBERT T. KILLIAN.